United States Patent
Buback et al.

(10) Patent No.: US 6,734,269 B1
(45) Date of Patent: May 11, 2004

(54) METHOD FOR CONTROLLED FREE RADICAL POLYMERIZATION OR COPOLYMERIZATION OF ETHYLENE UNDER HIGH PRESSURE IN THE PRESENCE OF AN INITIATOR-CONTROLLER

(75) Inventors: Michael Buback, Allemagne (DE); Eric Minaux, Epinal (FR); Thierry Senninger, Hayange (FR); Jean-Marc Le Blevec, Billere (FR)

(73) Assignee: Atofina, Cedex (FR)

( * ) Notice: Subject to any disclaimer, the term of this patent is extended or adjusted under 35 U.S.C. 154(b) by 0 days.

(21) Appl. No.: 09/807,147

(22) PCT Filed: Oct. 6, 1999

(86) PCT No.: PCT/FR99/02318

§ 371 (c)(1),
(2), (4) Date: Jun. 15, 2001

(87) PCT Pub. No.: WO00/20469

PCT Pub. Date: Apr. 13, 2000

(30) Foreign Application Priority Data

Oct. 6, 1998 (FR) .............................................. 98 12477
Aug. 5, 1999 (FR) .............................................. 99 10198

(51) Int. Cl.$^7$ ................................................. C08F 4/00
(52) U.S. Cl. ........................ 526/220; 526/217; 526/204; 526/141; 526/142; 526/348; 526/352
(58) Field of Search ................................ 526/220, 217, 526/204, 141, 142, 348, 352

(56) References Cited

U.S. PATENT DOCUMENTS

| 4,066,718 A | * | 1/1978 | Saito et al. ............. 260/878 B |
| 4,492,787 A | * | 1/1985 | Takashima et al. ........... 525/53 |
| 5,872,252 A | | 2/1999 | Sutoris et al. |
| 5,891,971 A | * | 4/1999 | Keoshkerian et al. ....... 526/210 |
| 5,919,871 A | | 7/1999 | Nicol et al. |

FOREIGN PATENT DOCUMENTS

| EP | 0 135 280 | 3/1985 |
| EP | 0 717 054 | 6/1996 |
| EP | 0 807 640 | 11/1997 |
| EP | 0 844 256 | 5/1998 |
| GB | 2 335 190 | 9/1999 |
| WO | WO 99/03894 | 1/1999 |

* cited by examiner

*Primary Examiner*—Ling-Siu Choi
(74) *Attorney, Agent, or Firm*—Jones Day

(57) ABSTRACT

The present invention relates to a process for the radical polymerization or copolymerization of ethylene under high pressure in the presence of at least one polymerization initiating-controlling compound capable of providing, by decomposition under the polymerization or copolymerization conditions:

at least one initiating free radical (Z) which carries at least one site for initiating the (co)polymerization; and at least one stable free radical (SFR) which carries at least one site exhibiting the stable radical state and which is stable under the polymerization conditions, with, in total, as many initiating sites as sites exhibiting the stable radical state.

31 Claims, No Drawings

METHOD FOR CONTROLLED FREE RADICAL POLYMERIZATION OR COPOLYMERIZATION OF ETHYLENE UNDER HIGH PRESSURE IN THE PRESENCE OF AN INITIATOR-CONTROLLER

The present invention relates to a process for the controlled radical polymerization or copolymerization of ethylene under high pressure in the presence an initiator-controller.

The polymerization under high pressure of ethylene or its copolymerization under high pressure with comonomers which can copolymerize by the radical route results in a large variety of products which have numerous applications, among which may be mentioned bases for adhesives, in particular hot melt adhesives, bituminous binders, wrapping films, coextrusion binders, moulded items, and the like.

Processes for the polymerization of ethylene at high temperatures and pressures by means of free radical initiators have been known for a long time. Ethylene polymers are obtained by homopolymerizing ethylene or by copolymerizing it with at least one other comonomer in a polymerization system which operates continuously under pressures of the order of 50 MPa to 500 MPa and at temperatures of between 50 and 300° C. The polymerization is carried out in continuous tubular reactors or stirred autoclaves in the presence of initiators and optionally of transfer agents. The polymers are subsequently separated from the volatile substances after their departure from the reactor in separators.

It is known that the polymerization of ethylene in the presence or in the absence of comonomers can result in reaction runaways (see, for example, Chem. Eng. Proc., 1998, 37, 55–59). These runaways are reflected by a very marked rise in the temperature and in the pressure and thus by bursting of the safety devices of the plant. Consequently, the runaway must result in undesired shutdowns in production. The aim is thus to avoid these shutdowns as far as possible and one means for doing this is to carefully control the flow rates of the reactants entering the reactor, in particular the flow rate of the source of radicals, that is to say of the initiator. This is because the injection of an excessively large amount of radicals results in a localized runaway in one of the regions of the reactor, which runaway subsequently spreads very quickly to the whole of the reactor. There thus exists a content of radicals not to be exceeded in order not to result in the runaway of the polymerization.

However, it is generally known that radical polymerizations can be controlled using stable free radicals, this control making it possible in particular to obtain polymers exhibiting narrow molecular mass distributions. Thus it is that United States Patent U.S. Pat. No. 5,449,724 discloses a radical polymerization process which consists in heating, at a temperature of approximately 40° C. to approximately 500° C. and under a pressure of approximately 50 MPa to 500 MPa, a mixture composed of a free radical initiator, of a stable free radical and of ethylene, in order to form a thermoplastic resin which has a molecular mass distribution of approximately 1.0 to approximately 2.0.

Furthermore, it is known, by International Patent Application WO 99/03894, to control the radical polymerization of monomers by the use, as (co)polymerization initiators, of specific alkoxyamines, these monomers being styrene, substituted styrenes, conjugated dienes, acrolein, vinyl acetate, anhydrides of (alkyl)acrylic acids, salts of (alkyl)acrylic acids, (alkyl)acrylic esters and alkyl-acrylamides. Ethylene is not mentioned as monomer. This polymerization is carried out under low pressure and at a temperature of between 50 and 180° C., preferably between 80 and 150° C., control of the reaction no longer being possible beyond 180° C. In other words, such a process could not work for the (co)polymerization of ethylene under high pressure, in which (co)polymerization the temperature conditions generally exceed 1800° C. This process furthermore exhibits the limitation according to which the polymers obtained have low molecular masses (not exceeding 15 000 in the examples).

In seeking to improve the known process for the controlled radical (co)polymerization of ethylene under high pressure, the Applicant Company has now discovered that, if use is made in (co)polymerization of an initiator-controller capable of providing at least one initiating free radical and at least one stable free radical, more specifically a free radical which is stable under the specific temperature conditions deployed in this high-pressure (co)polymerization, the latter is controlled under particularly favourable conditions while also controlling the reaction stability. The preferred initiators-controllers of the present invention, which will be described below, constitute a family of compounds which is not recommended according to WO 99/03894. It was therefore not obvious to thus control the high pressure (co)polymerization of ethylene, with greater effectiveness than with the use of an initiator and of a stable free radical, which are introduced separately, and with the observation, also surprising, that the (co)polymerization of ethylene takes place at a markedly greater rate. Furthermore, with the process of the invention, there is no limitation on the molecular masses of the (co)polymers obtained.

In addition, another consequence of the present invention is that, in the case where the initiator-controller chosen is such that it provides an initiating free macroradical, block copolymers are produced in which at least one of the blocks comprises ethylene as constituent. In point of fact, ethylene copolymers prepared under high pressure currently have random structures and it has not been possible to date to obtain such block copolymers having an ethylene-based block. It is well known that the structure of block copolymers can result in markedly better physicochemical properties than random copolymers. The present invention thus makes it possible to achieve the production of novel materials having novel properties.

The subject-matter of the present invention is thus first a process for the radical polymerization or copolymerization of ethylene under high pressure in the presence of at least one polymerization initiating-controlling compound capable of providing, by decomposition under the polymerization or copolymerization conditions:

at least one initiating free radical (Z) which carries at least one site for initiating the (co)polymerization; and at least one stable free radical (SFR) which carries at least one site exhibiting the stable radical state and which is stable under the polymerization conditions, with, in total, as many initiating sites as sites exhibiting the stable radical state.

In other words, when the initiator-controller dissociates, it produces, in the medium, as many initiating sites as stable radical sites. In the simplest case, the initiator-controller is such that it dissociates to give one initiating free radical and one stable free radical, the two radicals being monofunctional. Use may also be made of initiators-controllers which dissociate to give an n-functional initiating free radical and n monofunctional stable free radicals, or vice versa. Examples of various initiators-controllers are shown below.

The growing (co)polymer is thus positioned between the "initiating" part and the "controlling" part constituted by the stable free radical SFR.

The present invention thus involves the formation of a stable free radical. A stable free radical should not be confused with free radicals with a fleeting lifetime (a few milliseconds), such as the free radicals resulting from the usual polymerization initiators, such as peroxides, hydroperoxides and initiators of the azo type. The free radicals which initiate polymerization tend to accelerate the polymerization. In contrast, stable free radicals generally tend to slow down the polymerization. It may be generally said that a free radical is stable within the meaning of the present invention if it is not a polymerization initiator and if, under the operating conditions of the present invention, the mean lifetime of the radical is at least five minutes. During this mean lifetime, the molecules of the stable free radical continually alternate between the radical state and the state of a group bonded to a polymer chain via a covalent bond resulting from a coupling reaction between a radical centered on an oxygen atom and a radical centered on a carbon atom. Of course, it is preferable for the stable free radical to exhibit good stability throughout the duration of its use in the context of the present invention. Generally, a stable free radical can be isolated in the radical state at ambient temperature.

"Initiating" Part

In accordance with a first embodiment, the choice is made, as initiating-controlling compound, of a compound capable of providing at least one monofunctional radical Z chosen from those of the formulae (Ia) or (Ib) or (Ic):

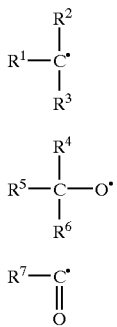

(Ia)

(Ib)

(Ic)

in which:

R$^1$, R$^2$, R$^3$, R$^4$, R$^5$, R$^6$ and R$^7$ each independently represent:
optionally substituted C$_{1-24}$ alkyl;
optionally substituted C$_{1-24}$ aryl;
it also being possible for R$^1$, R$^2$, R$^3$, R$^4$, R$^5$ and R$^6$ to each independently denote a hydrogen atom.

As examples of this first embodiment, the choice is made, as initiating-controlling compound, of a compound capable of providing at least one monofunctional radical Z chosen from those of the formulae (Ia$_1$), (Ia$_2$) or (Ia$_3$):

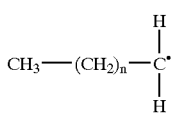

(Ia$_1$)

with n=0 or an integer from 1 to 23;

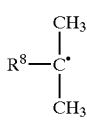

(Ia$_2$)

with R$^8$ representing hydrogen, methyl or ethyl; and

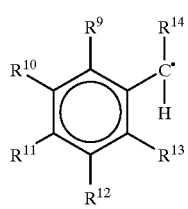

(Ia$_3$)

with:
R$^9$, R$^{10}$, R$^{11}$, R$^{12}$ and R$^{13}$ each independently representing alkyl, aryl or halogen; and
R$^{14}$ representing alkyl or aryl.

In accordance with a second embodiment, the choice is made, as initiating-controlling compound, of a compound capable of providing a radical Z of formula (II):

$$Z^1-(PM)^1-[(PM)^2]\cdot \quad (II)$$

in which:
Z$^1$ represents the initiating fragment of a radical initiator;
(PM)$^1$ represents a polymer block formed by living radical polymerization or copolymerization of at least one monomer which can polymerize by the radical route in the presence of an initiator which produces free radicals Z$^{1\cdot}$; and
(PM)$^2$, the presence of which is optional, represents another polymer block, other than (PM)$^1$, formed by living radical polymerization or copolymerization of at least one monomer which can polymerize by the radical route in the presence of the initiator Z$^1$-(PM)$^{1\cdot}$.

Mention may be made, as examples of (PM)$^1$ and (PM)$^2$ blocks, of those of the formulae:

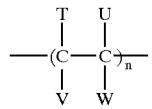

where:
T and U each independently represent hydrogen or a substituted or unsubstituted C$_{1-10}$ alkyl residue;
V and W each independently represent hydrogen, substituted or unsubstituted alkyl, substituted or unsubstituted aryl, —COOH, —COOR$^{15}$, —CN, —CONH$_2$, —CONHR$^{16}$, —CONR$^{17}$R$^{18}$,

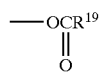

or —OR$^{20}$, R$^{15}$ to R$^{20}$ each independently representing substituted or unsubstituted alkyl or substituted or unsubstituted aryl; and
n denotes the degree of polymerization, which can in particular range up to 10 000.

This second embodiment thus relates to the use of macroinitiators-controllers, the "macro-initiator" part of which is prepared in a known way by living radical (co) polymerization under high pressure (for example>100 MPa), in the case where ethylene participates in the preparation of at least one of the blocks (T=U=V=W=H), or under low pressure, in the contrary case.

In accordance with a third embodiment, the choice is made, as initiating-controlling compound, of a compound capable of providing a polyfunctional radical Z carrying a plurality of initiating sites of

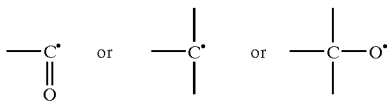

type. The functionality can vary between 2 and 10, preferably being between 2 and 4.

Mention may be made, by way of example, of a compound capable of providing a polyfunctional radical Z of formula:

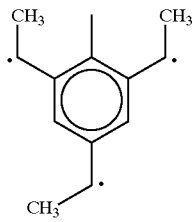

"Controlling" Part

The choice is advantageously made, as initiating-controlling compound, of a compound capable of providing at least one nitroxyl stable free radical comprising at least one =N—O· group.

The stable free radical or radicals is/are chosen in particular from nitroxide radicals, that is to say comprising the =N—O· group, in particular from those of the formulae (IIIa), (IIIb) or (IIIc):

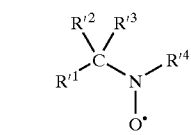
(IIIa)

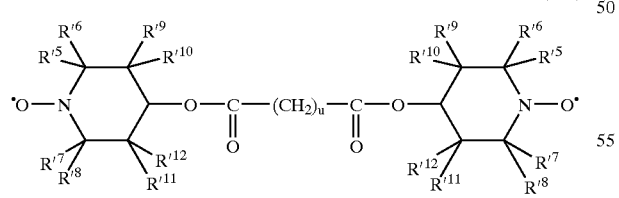
(IIIb)

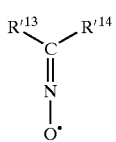
(IIIc)

in which:

$R'^1$ to $R'^3$, $R'^5$ to $R'^8$ and $R'^{13}$ and $R'^{14}$ each independently represent:

(a) a hydrogen atom;
(b) a halogen atom, such as chlorine, bromine or iodine;
(c) a saturated or unsaturated and linear, branched or mono- or polycyclic hydro-carbonaceous group which can be substituted by at least one halogen;
(d) an ester group —COOR$'^{15}$ or an alkoxyl group —OR$'^{16}$, R$'^{15}$ and R$'^{16}$ representing a hydrocarbonaceous group as defined in point (c) above;
(e) a polymer chain which can, for example, be a poly (alkyl methacrylate) or poly(alkyl acrylate) chain, such as poly(methyl methacrylate), a polydiene chain, such as polybutadiene, or a polyolefin chain, such as polyethylene or polybutadiene but preferably being a polystyrene chain;

$R'^4$ has the meanings defined in points (a), (b), (c), (d) and (e) above;

$R'^9$ to $R'^{12}$, which are identical or different, have the meanings defined in points (a) to (e) above and can in addition represent a hydroxyl group or an acid group, such as —COOH or —SO$_3$H;

it being possible for $R'^3$ and $R'^4$ to be connected to one another and, in the case where $R'^4$ represents a —CR$''^1$R$''^2$R$''^3$ residue (R$''^1$ to R$''^3$ having without distinction the meanings of R$'^1$ to R$'^3$), it being possible for $R'^3$ to be connected to R$''^3$, to form a heterocycle comprising the nitrogen atom of

it being possible for the said heterocycle to be saturated or unsaturated, to comprise, in the ring, at least one other heteroatom and/or at least one

group and also to comprise a saturated or unsaturated fused ring;

it being possible for two from $R'^1$ to $R'^3$, $R'^5$ and $R'^6$, $R'^7$ and $R'^8$, $R'^9$ and $R'^{10}$, $R'^{11}$ and $R'^{12}$, $R'^6$ and $R'^9$, $R'^8$ and $R'^{11}$, $R'^{13}$ and $R'^{14}$ and, in the case where $R'^4$ represents a —CR$''^1$R$''^2$R$''^3$ residue, $R'^3$ and R$''^3$ independently to be connected to one another to form, with the carbon atom which carries them, a saturated or unsaturated ring or heterocycle;

u is a non zero integer, for example from 1 to 18.

Mention may be made, as examples of hydrocarbonaceous groups as defined in point (c) above, of those having from 1 to 20 carbon atoms, such as linear, branched or cyclic alkyl radicals and aryl radicals, for example phenyl or naphthyl, and radicals comprising at least one aromatic ring which can be substituted, for example by a $C_1$–$C_4$ alkyl radical, such as aralkyl radicals, for example benzyl.

Mention may in particular be made of nitroxide radicals comprising a sequence, of formula:

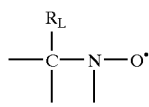

(1)

in which the $R_L$ radical exhibits a molar mass of greater than 15. The monovalent $R_L$ radical is said to be in the β-position with respect to the nitrogen atom of the nitroxide radical. The remaining valences of the carbon atom and of the nitrogen atom in the formula (1) can be bonded to various radicals, such as a hydrogen atom or a hydrocarbonaceous radical, such as an alkyl, aryl, or aralkyl radical, comprising from 1 to 10 carbon atoms. It is not excluded that the carbon atom and the nitrogen atom in the formula (1) should be connected to one another via a bivalent radical, so as to form a ring. However, the remaining valences of the carbon atom and of the nitrogen atom of the formula (1) are preferably bonded to monovalent radicals. The $R_L$ radical preferably exhibits a molar mass of greater than 30. The $R_L$ radical can, for example, have a molar mass of between 40 and 450. The $R_L$ radical can also comprise at least one aromatic ring, as for the phenyl radical or the naphthyl radical, it being possible for the latter to be substituted, for example by an alkyl radical comprising from 1 to 4 carbon atoms.

A specific family of nitroxide radicals which can be envisaged in accordance with the present invention is that of the nitroxide radicals of formula (IIIa) in which $R'^3$ and $R'^4$ (or $R'^3$ and $R''^3$) are connected to one another and which are chosen in particular from:

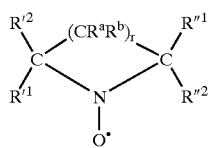

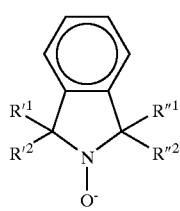

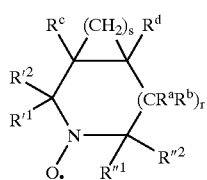

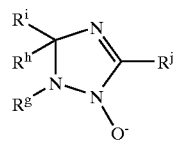

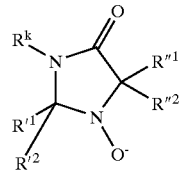

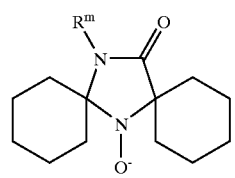

where:
$R^a$ to $R^k$ and $R^m$ independently have the meanings given for $R'^9$ to $R'^{12}$, it being possible for $R^a$ and $R^b$ and $R^e$ and $R^f$ to be identical or different when they are carried by different carbon atoms;
r has the value 2 or 3 or 4;
s a non zero integer, in particular from 1 to 10;
t has the value 0, 1 or 2.

The following may furthermore be indicated, as specific examples of nitroxide radicals:
2,2,5,5-tetramethyl-1-pyrrolidinyloxy (generally sold under the trade name PROXYL):

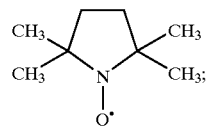

3-carboxy-2,2,5,5-tetramethyl-1-pyrrolidinyloxy (commonly known as 3-carboxy-PROXYL);
2,2,6,6-tetramethyl-1-piperidinyloxy (commonly known as TEMPO):

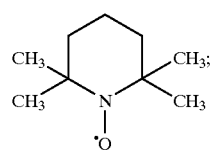

4-hydroxy-2,2,6,6-tetramethyl-1-piperidinyloxy (commonly known as 4-hydroxy-TEMPO);

4-methoxy-2,2,6,6-tetramethyl-1-piperidinyloxy (commonly known as 4-methoxy-TEMPO):

4-oxo-2,2,6,6-tetramethyl-1-piperidinyloxy (commonly known as 4-oxo-TEMPO);

bis(1-oxyl-2,2,6,6-tetramethylpiperidin-4-yl) sebacate, represented by the formula:

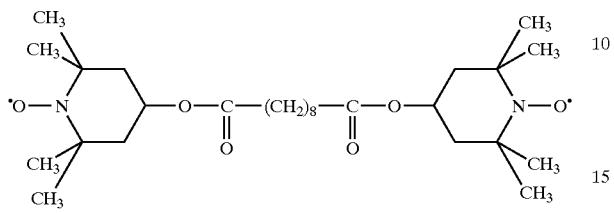

(sold under the trade name "CXA 5415" by "Ciba Specialty Chemical");

N-tert-butyl-1-phenyl-2-methylpropyl nitroxide:

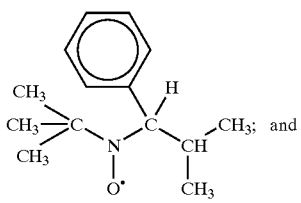

N-tert-butyl-1-(2-naphthyl)-2-methylpropyl nitroxide.

In a particularly preferred way, however, use is made of an alkoxyamine as initiating-controlling compound and more particularly of an alkoxyamine for which the nitrogen atom of the nitroxide group forms part of a $C_{5-12}$ ring, the other atoms of which are generally carbon atoms.

Mention may also particularly be made of alkoxyamines, the nitroxide of which does not decompose to more than 50% over 2 hours at 180° C. under 200 MPa (2 000 bar) in heptane.

The alkoxyamines are known compounds or compounds the manufacture of which has been described in the literature. Reference may be made, inter alia, to Macromolecules, 1996, 29, 5245–5254, to Macromolecules, 1996, 29, 7661–7670, and to French Patent Application No. 99-04405 of 8 Apr. 1999 on behalf of the Applicant Company.

Specific examples of initiators-controllers of the present invention are the following:

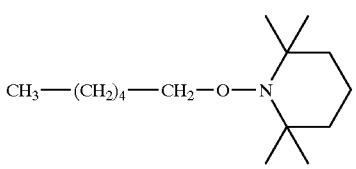

(2,2,6,6-tetramethyl-1-piperidinyloxyhexane)

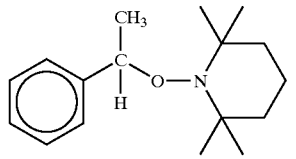

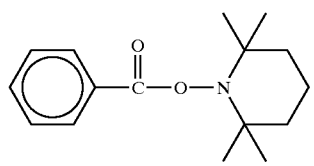

In accordance with the present invention, the ratio of the initiating-controlling compound/monomer(s) is generally within the range from 0.0001% to 10% by weight, in particular within the range from 0.0005% to 5% by weight.

Furthermore, the (co)polymerization of the present invention is generally carried out under a pressure of 150 to 300 MPa, in particular of 150 to 250 MPa, and at a temperature of 100 to 300° C., in particular of 180 to 250° C.

There is no limitation with regard to the molecular masses of the (co)polymers obtained according to the invention. According to the polymerization or copolymerization conditions and in particular the duration, the temperature or the degree of conversion of monomer to polymer or copolymer, it is possible to prepare products of different molecular masses. In particular, in the case of the polymerization of ethylene, the process of the invention is carried out at a temperature, a pressure and a duration which are sufficient for the polyethylene obtained to have a weight-average molecular mass of greater than 80 000 and a number-average molecular mass of greater than 20 000.

The process according to the invention can be carried out in the presence of a solvent. The solvent is chosen in particular from benzene, toluene, xylene, ethyl acetate, methanol, ethanol, propanol, isopropanol, butanol, isobutanol, amyl alcohol, dimethyl sulphoxide, glycol, dimethylformamide, tetrahydrofuran and their mixtures, the solvent/polymerization ingredients (namely monomer(s)+initiator-controller) ratio by weight advantageously being at most 5.

The process according to the present invention can also be carried out in the presence of a transfer agent in the usual amounts. The transfer agents which can be used are well known to a person skilled in the art who is an expert in the (co)polymerization of ethylene under high pressure. Mention may in particular be made of alkanes, for example butane, alkenes, for example propylene, and oxygen-comprising derivatives, such as, for example, aldehydes or alcohols.

In accordance with the present invention, the ethylene can be copolymerized with any other monomer exhibiting a carbon-carbon double bond capable of polymerizing or copolymerizing by the radical route.

The monomer or monomers can thus be chosen from vinyl, allyl, vinylidene, diene and olefinic monomers (other than ethylene).

The term "vinyl monomers" is understood to mean in particular (meth)acrylates, vinylaromatic monomers, vinyl esters, vinyl ethers, (meth)acrylonitrile, (meth)acrylamide and mono- and di($C_1$–$C_{18}$ alkyl) (meth)acrylamides, and monoesters and diesters of maleic anhydride and of maleic acid.

The (meth)acrylates are in particular those of the formulae respectively:

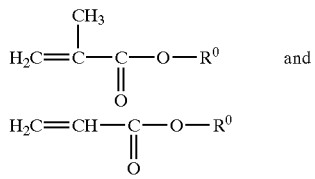

in which $R^0$ is chosen from $C_1$–$C_{18}$ alkyl radicals of linear or branched and primary, secondary or tertiary type, $C_5$–$C_{18}$ cycloalkyl radicals, ($C_1$–$C_{18}$)alkoxy($C_1$–$C_{18}$)-alkyl radicals, ($C_1$–$C_{18}$)alkylthio($C_1$–$C_{18}$)alkyl radicals, aryl radicals and arylalkyl radicals, these radicals optionally being substituted by at least one halogen atom and/or at least one hydroxyl group, the above alkyl groups being linear or branched; and glycidyl, norbornyl or isobornyl (meth)acrylates.

Mention may be made, as examples of useful methacrylates, of methyl, ethyl, 2,2,2-trifluoroethyl, n-propyl, isopropyl, n-butyl, sec-butyl, tert-butyl, n-amyl, i-amyl, n-hexyl, 2-ethylhexyl, cyclohexyl, octyl, i-octyl, nonyl, decyl, lauryl, stearyl, phenyl, benzyl, β-hydroxyethyl, isobornyl, hydroxypropyl or hydroxybutyl methacrylates. Mention may be made, in particular, of methyl methacrylate.

Mention may be made, as examples of acrylates of the above formula, of methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl acrylates.

The term "vinylaromatic monomer" is understood to mean, within the meaning of the present invention, an aromatic monomer comprising ethylenic unsaturation, such as styrene, vinyltoluene, α-methylstyrene, 4-methylstyrene, 3-methylstyrene, 4-methoxystyrene, 2-(hydroxymethyl) styrene, 4-ethylstyrene, 4-ethoxystyrene, 3,4-dimethylstyrene, styrenes substituted on the ring by a halogen, such as 2-chlorostyrene, 3-chlorostyrene, 4-chloro-3-methylstyrene, 4-chloro-3-(tert-butyl)styrene, 2,4-dichlorostyrene and 2,6-dichlorostyrene, 1-vinylnaphthalene and vinylanthracene.

Mention may be made, as vinyl esters, of vinyl acetate, vinyl propionate, vinyl chloride and vinyl fluoride and mention may be made, as vinyl ethers, of vinyl methyl ether and vinyl ethyl ether.

Mention is made, as vinylidene monomer, of vinylidene fluoride.

The term "diene monomer" is understood to mean a diene chosen from conjugated or nonconjugated and linear or cyclic dienes, such as, for example, butadiene, 2,3-dimethylbutadiene, isoprene, chloroprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylene-2-norbornene, 5-(2-propenyl)-2-norbornene, 5-(5-hexenyl)-2norbornene, 1,5-cyclooctadiene, bicyclo[2.2.2]octa-2,5-diene, cyclopentadiene, 4,7,8,9-tetrahydroindene, isopropylidenetetrahydroindene and piperylene.

Mention may be made, as olefinic monomers, of olefins comprising from three to twenty carbon atoms and in particular the a-olefins of this group. Mention may be made, as olefin, of propylene, 1-butene, 4-methyl-1-pentene, 1-octene, 1-hexene, isobutylene, 3-methyl-1-pentene, 3-methyl-1-butene, 1-decene, 1-tetradecene or their mixtures. Fluorinated olefinic monomers may also be mentioned.

Mention may also be made, as (co)polymerizable monomers, of α- or β-ethylenically unsaturated $C_{3-8}$ carboxylic acids, such as maleic acid, fumaric acid, itaconic acid, acrylic acid, methacrylic acid and crotonic acid; or α- or β-ethylenically unsaturated carboxylic acid anhydrides, such as maleic anhydride or itaconic anhydride.

Preferred comonomers are, inter alia, vinyl acetate, n-butyl acrylate, 2-ethylhexyl acrylate, methyl acrylate and ethyl acrylate.

The process according to the invention is carried out in a tubular reactor or autoclave or a combination of the two.

Autoclave and tubular processes are both included among the polymerization processes referred to as "high pressure" polymerization processes known to a person skilled in the art. These two processes involve the polymerization of ethylene by the radical route under high pressure, generally between 100 and 350 MPa, and at temperatures greater than the melting temperature of the polyethylene being formed. The tubular process involves polymerization in a tubular reactor. A tubular reactor comprises cylinders with an internal diameter generally of between 1 and 10 cm and a length generally ranging from 0.1 to 3 km. In a tubular reactor, the reaction mixture is driven with a high linear speed, generally of greater than 2 metres per second, with short reaction times which can, for example, be between 0.1 and 5 min.

The pressure in the tubular reactor can, for example, be between 200 and 350 MPa, preferably between 210 to 280 MPa, for example between 230 and 250 MPa. The temperature in the tubular reactor can range from 120 to 350° C. and preferably from 150 to 300° C.

The autoclave process involves polymerization 20 in an autoclave with a length/diameter ratio generally ranging from 1 to 25, in the case of a single-zone reactor. In the case of a multiple-zone reactor, the length of each zone/diameter ratio generally ranges from 0.5 to 6, it being understood that the reaction mixture flows in the lengthwise direction.

The pressure in the autoclave reactor can, for example, be between 100 and 250 MPa, preferably between 120 and 180 MPa, for example between 140 and 170 MPa. The temperature in the autoclave reactor can range from 180 to 300° C., preferably from 240 to 290° C.

The present invention also relates to block copolymers for which at least one of the blocks comprises ethylene as constituent. As already indicated above, these block copolymers are prepared by using the macroinitiators-controllers described above with reference to the second embodiment.

Mention may in particular be made of the block copolymers of the type:

Polystyrene-(b) -polyethylene

Polyacrylate-(b)-polyethylene

Polymethacrylate-(b)-polyethylene

Poly(styrene-(co)-acrylate)-(b)-polyethylene

Polystyrene-(b)-poly(ethylene-(co)-acrylate)

Polystyrene-(b)-poly(ethylene-(co)-vinyl acetate), it being possible for such block copolymers, as well as the homopolymers of ethylene and the random copolymers obtained according to the invention, to have numerous applications as base for adhesives, for coextrusion binders, for films, for bituminous binders, for packaging, for moulded items, and the like.

Comparative examples and nonlimiting examples describing the preparation of polymers as obtained according to the process of the present invention are given below. In these examples, the following abbreviations were used:

BPO: benzoyl peroxide

DTBP: di-tert-butyl peroxide

TEMPO: 2,2,6,6-tetramethyl-1-piperidinyloxy

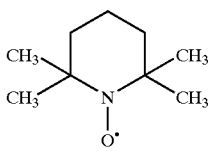

Hexyl-TEMPO:

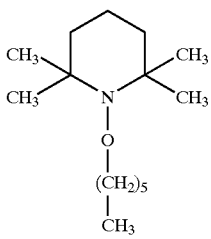

CXA 5415: bis(1-oxyl-2,2,6,6-tetramethylpiperidin-4-yl) sebacate:

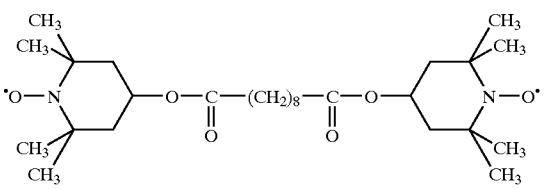

(sold under the trade name "CXA 5415" by "Ciba Specialty Chemical").

In these examples, the control of the polymerization was assessed using the curve ln(1/(1-conversion)) as a function of time. The more the curve deviates from linearity, the poorer the control. Furthermore, in Examples 2 (comp.), 3, 4 (comp.) and 5, the mean rate of polymerization (expressed in $min^{-1}$) is the slope of the straight regression line plotted from the ln(1/(1-conversion)) curve.

EXAMPLE 1 (COMPARATIVE)

Uncontrolled Polymerization of Ethylene at 250 MPa and at 250° C. with the BPO+TEMPO Initiating System A metal reactor, made of steel which is resistant to high pressure, is preheated using ring heaters to a temperature of 250° C. After rinsing the reactor several times with ethylene at 6 MPa and then at 100 MPa, the reactor is charged with ethylene (17.6 g) and then, using a syringe, the following are injected into the reactor:

0.016 g of BPO (210 molar ppm of free radicals with respect to the ethylene);
0.013 g of TEMPO; and
0.8 g of xylene.

The TEMPO/BPO molar ratio is 1.25, which corresponds to an SFR/Z ratio of 0.63 (i.e. a ratio of less than 1.0).

The pressure is subsequently increased to approximately 100 MPa, using a mechanical pump and then to the desired value of 250 MPa, using a manual pump.

The conversion is measured continuously using an infrared spectrometer connected to the reactor.

Runaway of the polymerization occurs, so much that no control of the polymerization is possible.

This example emphasizes that an SFR/Z ratio<1 is insufficient to control the polymerization. Conversely, it is now well known that an SFR/Z ratio>1 is unfavourable to the rate of polymerization (the excess of stable radicals having a tendency to slow down the polymerizations).

The use of an initiator-controller introduces the advantage of automatically obtaining the optimum SFR/Z ratio of 1.0.

EXAMPLE 2 (COMPARATIVE)

Polymerization of Ethylene at 170 MPa and at 230° C. with the DTBP+TEMPO Initiating System The polymerization is carried out as in Example 1, except that the ethylene charge is 17.9 g, that the reaction is carried out at a temperature of 230° C. instead of 250° C. and at a pressure of 170 MPa instead of 250 MPa and that the BPO+TEMPO system is replaced by the following system:

0.005 g of DTBP (106 molar ppm of free radicals with respect to the ethylene); and
0.011 g of TEMPO.

The TEMPO/DTBP molar ratio is 2.0, which corresponds to an SFR/Z ratio of 1.

The following conversions over time are obtained:

| Time (min) | Conversion (%) | ln(1/(1-conversion)) |
|---|---|---|
| 0 | 0 | 0 |
| 15 | 2.7 | 0.027 |
| 30 | 8.5 | 0.089 |
| 45 | 15.2 | 0.165 |
| 60 | 21.2 | 0.238 |

The mean rate of polymerization is 0.0951 $mint^{-1}$.

EXAMPLE 3

Polymerization of Ethylene at 170 MPa and at 230° C. with the hexyl-TEMPO Initiator-controller The operating conditions of Example 2 are used, except that the BPO+TEMPO system is replaced by the following "initator-controller" compound: 0.016 g of hexyl-TEMPO (104 molar ppm of free radicals with respect to the ethylene). The SFR/Z ratio is 1.0.

The following conversions over time are obtained:

| Time (min) | Conversion (%) | ln(1/(1-conversion)) |
|---|---|---|
| 0 | 0 | 0 |
| 15 | 10.9 | 0.115 |
| 30 | 21 | 0.236 |
| 45 | 28.2 | 0.331 |
| 60 | 34.7 | 0.426 |

The rate of polymerization, which is here 0.1224 $min^{-1}$, is higher than for Comparative Example 2 (i.e. 23% more), while the operating conditions are the same: pressure, temperature and amount of radicals with respect to the ethylene. In addition, the curve ln(1/(1-conversion)) as a function of time is a straight line, which indicates good control of the polymerization.

Electron paramagnetic spectrometry measurements on hexyl-TEMPO furthermore show that it is necessary to raise the temperature above 200° C. to see the appearance of a signal. This means that the C—O bond only cleaves from this temperature. In point of fact, the bond between the polyethylene chain and the TEMPO, (—CH$_2$-TEMPO) is of the same nature. It is therefore necessary to heat above 200° C. to be able to cleave the bond between the TEMPO and the polymer. The conditions of the process of the present invention are therefore different from those of the process according to WO 99/03894, for which the temperature must not exceed 180° C. if control of the polymerization is not to be lost.

EXAMPLE 4 (COMPARATIVE)

Polymerization of Ethylene at 200 MPa and 220° C. with the DTBP+CXA 5415 Initiating System The operating conditions of Example 1 are used, except that the ethylene charge is 18.3 g, that the reaction is carried out at a temperature of 220° C. instead of 250° C. and at 200 MPa instead of 250 MPa and that the BPO+TEMPO system is replaced by the following system:

0.0045 g of DTBP (94 molar ppm of free radicals with respect to the ethylene); and 0.016 g of CXA 5415.

The CXA 5415/DTBP molar ratio is 1.0, which is equivalent to an SFR/Z ratio of 1.0.

The following conversions over time are obtained:

| Time (min) | Conversion (%) | ln(1/(1-conversion)) |
|---|---|---|
| 0 | 0 | 0 |
| 15 | 0.3 | 0.003 |
| 30 | 0.7 | 0.007 |
| 45 | 2.2 | 0.022 |
| 60 | 4.7 | 0.048 |

The polymerization is particularly slow (0.0008 min$^{-1}$): only 4.7% conversion is observed after one hour. Furthermore, the curve ln(1/(1-conversion)) exhibits a marked curvature, which means that the polymerization is not very well controlled.

EXAMPLE 5

Polymerization of Ethylene at 200 MPa and 220° C. with the hexyl-TEMPO Initiator-controller The operating conditions of Comparative example 4 are used, except that the ethylene charge is 18.3 g and that 0.0157 g of hexyl-TEMPO (99 molar ppm of free radicals with respect to the ethylene) is used instead of the CXA 5415/DTBP system.

The following conversions over time are obtained:

| Time (min) | Conversion (%) | ln(1/(1-conversion)) |
|---|---|---|
| 0 | 0 | 0 |
| 15 | 9.3 | 0.098 |
| 30 | 13.3 | 0.143 |
| 45 | 16.8 | 0.184 |
| 60 | 20.4 | 0.228 |
| 75 | 27.1 | 0.316 |

The polymerization exhibits a higher rate of polymerization than for Comparative Example 4, namely of 0.0038 min$^{-1}$ (i.e. 375% more than in Comparative Example 4), while the operating conditions are identical: pressure, temperature and amount of radicals with respect to the ethylene. At the end of one hour, the conversion has already reached 20*t. Furthermore, the curve ln(1/(1-conversion)) as a function of time is a straight line, which indicates good control of the polymerization.

Like Example 3, this example shows that hexyl-TEMPO makes possible more efficient control of the polymerization of ethylene than initiator+stable radical mixtures and, furthermore, that it provides higher rates of polymerization.

EXAMPLE 6

Polymerization of Ethylene at 170 MPa and 250oC with the hexyl-TEMPO Radical Initiator The operating conditions of Example 1 are used, except that the ethylene charge is 17.0 g and that 0.086 g of hexyl-TEMPO (587 molar ppm of free radicals with respect to the ethylene) is used instead of the BPO+TEMPO) system.

The following conversions over time are obtained:

| Time (min) | Conversion (%) | ln(1/(1-conversion)) |
|---|---|---|
| 0 | 0 | 0 |
| 15 | 31.8 | 0.383 |
| 30 | 52.9 | 0.753 |
| 45 | 62.1 | 0.970 |
| 60 | 68.2 | 1.146 |
| 75 | 72 | 1.273 |

Despite the severe conditions applied (large amount of radicals released due to the large amount of hexyl-TEPO, and high temperature) the polymerization remains controlled and does not exhibit runaway. Furthermore, the conversion is high. It would be impossible to carry out such a test without a stable radical as this would result in a very strong runaway of polymerization.

What is claimed is:

1. Process for the radical polymerization or copolymerization of ethylene under high pressure in the presence of at least one polymerization initiating-controlling compound capable of providing, by decomposition under the polymerization or copolymerization conditions:

at least one initiating free radical (Z) which carries at least one site for initiating the (co) polymerization; and at least one stable free radical (SFR) which carries at least one site exhibiting the stable radical state and which is stable under the polymerization conditions, with, in total, as many initiating sites as sites exhibiting the stable radical state.

2. Process according to claim 1, wherein the choice is made, as initiating-controlling compound, of a compound capable of providing at least one monofunctional radical Z chosen from those of the formulae (Ia) or (Ib) or (Ic):

(Ia)

(Ib)

(Ic)

in which:

R$^1$, R$^2$, R$^3$, R$^4$, R$^5$, R$^6$ and R$^7$ each independently represent:
- optionally substituted C$_{1-24}$ alkyl; or
- optionally substituted C$_{5-24}$ aryl; and it also being possible for R$^1$, R$^2$, R$^3$, R$^4$, R$^5$ and R$^6$ to each independently denote a hydrogen atom.

3. Process according to claim 1, wherein the choice is made, as initiating-controlling compound, of a compound capable of providing at least one monofunctional radical Z chosen from those of the formulae (Ia$_1$), (Ia$_2$) or (Ia$_3$):

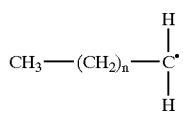

(Ia$_1$)

with n=0 or an integer from 1 to 23;

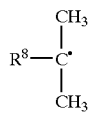

(Ia$_2$)

with R$^8$ representing hydrogen, methyl or ethyl; and

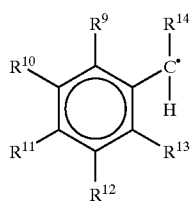

(Ia$_3$)

with:

R$^9$, R$^{10}$, R$^{11}$, R$^{12}$ and R$^{13}$ each independently representing alkyl, aryl or halogen; and R$^{14}$ representing alkyl or aryl.

4. Process according to claim 1, wherein the choice is made, as initiating-controlling compound, of a compound capable of providing a radical Z of formula (II):

$$Z^1—(PM)^1—[(PM)^2]^{\bullet} \quad \text{(II)}$$

in which:

Z$^1$ represents the initiating fragment of a radical initiator;

(PM)1 represents a polymer block formed by living radical polymerization or copolymerization of at least one monomer which can polymerize by the radical route in the presence of an initiator which produces free radicals Z$^{1\bullet}$; and (PM)$^2$, the presence of which is optional, represents another polymer block, other than (PM)$^1$, formed by living radical polymerization or copolymerization of at least one monomer which can polymerize by the radical route in the presence of the initiator Z$^1$—(PM)$^{1\bullet}$.

5. Process according to claim 4, wherein the (PM)$^1$ and (PM)$^2$ blocks have the formula:

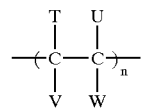

where:

T and U each independently represent hydrogen or a substituted or unsubstituted C$_{1-10}$ alkyl residue;

V and W each independently represent hydrogen, substituted or unsubstituted alkyl, substituted or unsubstituted aryl, —COOH, —COOR$^{15}$, —CN, —CONH$_2$, —CONHR$^{16}$, —CONR$^{17}$R$^{18}$,

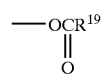

or OR$^{20}$, R$^{15}$ to R$^{20}$ each independently representing substituted or unsubstituted alkyl or substituted or unsubstituted aryl; and n denotes the degree of polymerization.

6. Process according to claim 1, wherein the choice is made, as initiating-controlling compound, of a compound capable of providing a polyfunctional radical Z carrying a plurality of initiating sites of

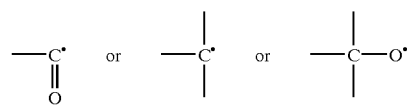

type.

7. Process according to claim 6, wherein the choice is made, as initiating-controlling compound, of a compound capable of providing a polyfunctional radical Z of formula:

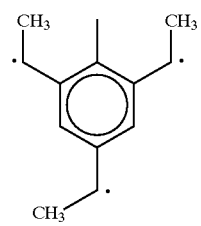

8. Process according to one of claims 1 to 7, wherein the choice is made, as initiating-controlling compound, of a compound capable of providing at least one nitroxyl stable free radical comprising at least one =N—O• group.

9. Process according to claim 8, wherein the choice is made, as initiating-controlling compound, of a compound capable of providing at least one nitroxyl stable free radical chosen from those of the formulae (IIIa), (IIIb) or (IIIc):

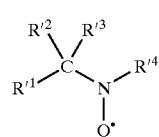

(IIIa)

-continued

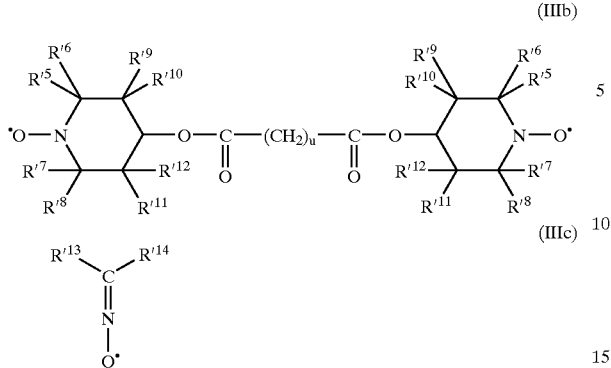

(IIIb)

(IIIc)

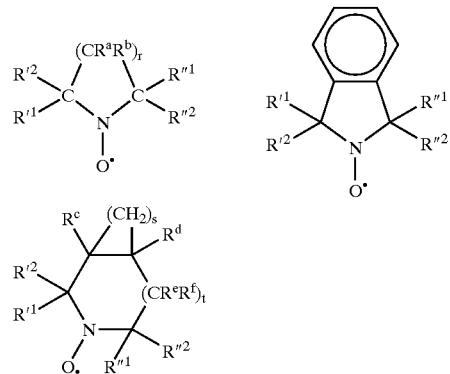

in which:
- $R'^1$ to $R'^3$, $R'^5$ to $R'^8$ and $R'^{13}$ and $R'^{14}$ each independently represent:
  (a) a hydrogen atom;
  (b) a halogen atom;
  (c) a saturated or unsaturated and linear, branched or mono- or polycyclic hydro-carbonaceous group which can be substituted by at least one halogen;
  (d) an ester group —COOR'$^{15}$ or an alkoxyl group —OR'$^{16}$, R'$^{15}$ and R'$^{16}$ representing a hydrocarbonaceous group as defined in point (c) above; or
  (e) a polymer chain;
- $R'^4$ has the meanings defined in points (a), (b), (c), (d) and (e) above;
- $R'^9$ to $R'^{12}$, which are identical or different, have the meanings defined in points (a) to (e) above and can in addition represent a hydroxyl group or an acid group, such as —COOH or —SO$_3$H;

it being possible for $R'^3$ and $R'^4$ to be connected to one another and, in the case where $R'^4$ represents a —CR"$^1$R"$^2$R"$^3$ residue (R"$^1$ to R"$^3$ having without distinction the meanings of $R'^1$ to $R'^3$), it being possible for $R'^3$ to be connected to R"$^3$, to form a heterocycle comprising the nitrogen atom of

it being possible for the said heterocycle to be saturated or unsaturated, to comprise, in the ring, at least one other heteroatom and/or at least one

group and also to comprise a saturated or unsaturated fused ring;

it being possible for two from $R'^1$ to $R'^3$, $R'^5$ and $R'^6$, $R'^7$ and $R'^8$, $R'^9$ and $R'^{10}$, $R'^{11}$ and $R'^{12}$, $R'^6$ and $R'^9$, $R'^8$ and $R'^{11}$, or $R'_{13}$ and $R'^{14}$ and, in the case where $R'^4$ represents a —CR"$^1$R"$^2$R"$^3$ residue, $R'^3$ and R"3 independently to be connected to one another to form, with the carbon atom which carries them, a saturated or unsaturated ring or heterocycle; and u is a non zero integer.

10. Process according to claim 1, wherein the choice is made, as initiating-controlling compound, of a compound capable of providing at least one nitroxyl stable free radical chosen from:

where:

$R^a$ to $R^f$ have independently the meanings given for $R'^9$ to $R'^{12}$, it being possible for $R^a$ and $R^b$ and $R^e$ and $R^f$ to be identical or different when they are carried by different carbon atoms;

r has the value 2 or 3 or 4;

s is a non zero integer; and t has the value 0, 1 or 2.

11. Process according to claim 9, wherein the choice is made, as initiating-controlling compound, of a compound capable of providing at least one nitroxide stable radical chosen from:

2,2,5,5-tetramethyl-1-pyrrolidinyloxy;

3-carboxy-2,2,5,5-tetramethyl-1-pyrrolidinyloxy;

2,2,6,6-tetramethyl-1-piperidinyloxy;

4-hydroxy-2,2,6,6-tetramethyl-1-piperidinyloxy;

4-methoxy-2,2,6,6-tetramethyl-1-piperidinyloxy;

4-oxo-2,2,6,6-tetramethyl-1-piperidinyloxy;

bis (1-oxyl-2,2,6,6-tetramethylpiperidin-4-yl) sebacate;

N-tert-butyl-1-phenyl-2-methylpropyl nitroxide; and

N-tert-butyl-1-(2-naphthyl)-2-methylpropyl nitroxide.

12. Process according to claim 1, wherein an alkoxyamine is used as initiating-controlling compound.

13. Process according to claim 1, wherein use is made, as initiating-controlling compound, of an alkoxyamine having a nitroxide, the nitroxide does not decompose to more than 50% over 2 hours at 180° C. under 200 MPa heptane.

14. Process according to claim 1, wherein use is made, as initiating-controlling compound, of a compound chosen from:

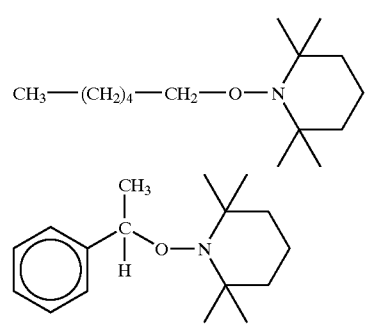

-continued

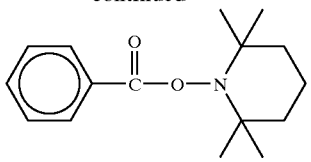

15. Process according to claim 1, wherein the ratio of the initiating-controlling compound/monomer(s) is within the range from 0.0001% to 10% by weight.

16. Process according to claim 15, wherein the ratio of the initiating-controlling compound/monomer(s) is within the range from 0.0005% to 5% by weight.

17. Process according to claim 1, wherein it is carried out under a pressure of 150 to 300 MPa.

18. Process according to claim 17, wherein it is carried out under a pressure of 150 to 250 MPa.

19. Process according to claim 1, wherein it is carried out at a temperature of 100 to 300° C.

20. Process according to claim 19, wherein it is carried out at a temperature of 180 to 250° C.

21. Process according to claim 1 for the polymerization of ethylene, wherein it is carried out at a temperature, a pressure and a duration which are sufficient for the polyethylene obtained to have a weight-average molecular mass of greater than 80000 and a number-average molecular mass of greater than 20000.

22. Process according to claim 1, wherein it is carried out in the presence of a solvent.

23. Process according to claim 22, wherein the solvent is chosen from benzene, toluene, xylene, ethyl acetate, methanol, ethanol, propanol, isopropanol, butanol, isobutanol, amyl alcohol, dimethyl sulphoxide, glycol, dimethyl-formamide, tetrahydrofuran and their mixtures.

24. Process according to claim 22, wherein the solvent/polymerization ingredients ratio by weight is at most 5.

25. Process according to claim 1, wherein it is carried out in the presence of a transfer agent.

26. Process according to claim 1, wherein it comprises a copolymerization of ethylene with at least one comonomer chosen from vinyl, allyl, vinylidene, diene and olefinic monomers.

27. Process according to claim 1, wherein it is carried out in a tubular reactor or autoclave or a combination of the two.

28. Process according to claim 5, wherein n ranges up to 10,000.

29. Process according to claim 8, wherein the choice is made, as the initiafing-controlling compound, of a compound of the following formulae:

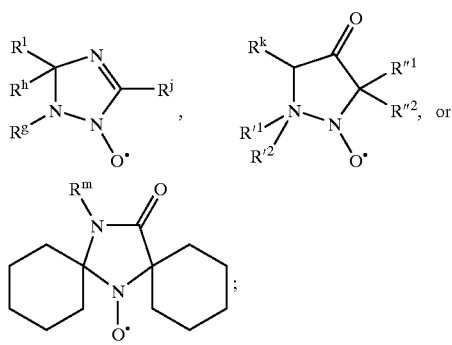

wherein:
$R^g$, $R^h$, $R^i$, $R^j$, $R^k$ and $R^m$ each independently represent:
(a) a hydrogen atom,
(b) a halogen atom,
(c) a saturated or unsaturated and linear, branched or mono- or polycyclic hydrocarboneous group which can be substituted by at least one halogen,
(d) an ester group —COOR'$^{15}$ or an alkoxyl group —OR'$^{16}$, R'$^{15}$ and R'$^{16}$ representing a hydrocarbonaceous group as defined in (c) above,
(e) a polymer chain,
(f) a hydroxyl group, or
(g) an acid group such as —COOH or —SO$_3$H; and
$R'^1$, $R'^2$, $R''^1$ and $R''^2$ each independently represent (a), (b), (c), (d) or (e) above.

30. Block copolymers obtained by controlled radical polymerization or copolymerization of ethylene under high pressure in the presence of at least one polymerization initiating-controlling compound having provided, by decomposition under the polymerization or copolymerization conditions:

at least one initiating free radical (Z) which carries one site for initiating the (co)polvmerization and which has the formula (II):

$$Z^1\text{---}(PM)^1\text{---}[(PM)^2]^* \quad \text{(II)}$$

in which:

$Z^1$ represents the initiating fragment of a radical initiator;

$(PM)^1$ represents a Polymer block formed by living radical polymerization or copolymerization of at least one monomer which can polymerize by the radical route in the presence of an initiator which produces free radicals $Z^{1\bullet}$; and $(PM)^2$, the presence of which is optional, represents another polymer block, other than $(PM)^1$, formed by living radical polymerization or copolymerization of at least one monomer which can polymerize by the radical route in the presence of the initiator—$Z^1$—$(PM)^{1\bullet}$, and at least one stable free radical which carries one site exhibiting the stable free radical state and which is stable under the polymerization conditions.

31. Block copolymer according to claim 28, wherein each $(PM)^1$ block and each $(PM)^2$ block has the formula:

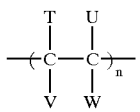

where:

T and U each independently represent hydrogen or a substituted or unsubstituted $C_{1\text{-}10}$ alkyl residue;

V and W each independently represent hydrogen, substituted or unsubstituted alkyl, substituted or unsubstituted aryl, —COOH, —COOR$^{15}$, —CN, —CONH$_2$, —CONHR$^{16}$, —CONR$^{17}$R$^{18}$,

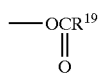

or OR$^{20}$, R$^{15}$ to R$^{20}$ each independently representing substituted or unsubstituted alkyl or substituted or unsubstituted aryl; and n denotes the degree of polymerization.

* * * * *